United States Patent [19]

Einerhand et al.

[11] 4,113,508

[45] Sep. 12, 1978

[54] IRON BLUE PIGMENT COMPOSITION AND PROCESS FOR ITS PRODUCTION

[75] Inventors: Johan Jozef Einerhand; Leonardus Johannes Hubertus Erkens, both of Maastricht; René Johannes Laenen, Bunde; Joseph Wilhelmus Jacobus Hoofs, Meerssen, all of Netherlands

[73] Assignee: Hercules Incorporated, Wilmington, Del.

[21] Appl. No.: 809,336

[22] Filed: Jun. 23, 1977

[30] Foreign Application Priority Data

Jul. 7, 1976 [NL] Netherlands .......................... 7607496

[51] Int. Cl.$^2$ .............................................. C09C 1/26
[52] U.S. Cl. ................. 106/304; 106/308 Q; 106/308 N; 106/259; 106/262
[58] Field of Search .................. 106/304, 308 N, 309, 106/308 Q, 259, 262

[56] References Cited

U.S. PATENT DOCUMENTS

| | | | |
|---|---|---|---|
| 2,809,122 | 8/1957 | Willis et al. | 106/308 Q |
| 2,893,886 | 7/1959 | Erskine et al. | 106/304 |

*Primary Examiner*—Winston A. Douglas
*Assistant Examiner*—J. V. Howard
*Attorney, Agent, or Firm*—Hazel L. Deming

[57] ABSTRACT

The production of iron blue pigment compositions by a flushing process has been found to be improved by carrying out the flushing step in the presence of an amine flushing agent and incorporating into the composition during or after flushing at least one surfactant of the polyoxyethylene type. The resulting iron blue compositions have improved consistency and dispersibility in printing inks, paints and the like.

10 Claims, No Drawings

IRON BLUE PIGMENT COMPOSITION AND PROCESS FOR ITS PRODUCTION

This invention relates to an improved flushing process for producing iron blue pigment compositions and to the compositions so produced.

It is known that the dispersion qualities of iron blue pigments can be improved by flushing the pigment from its water-wet form into an oil binder in the presence of an amine type flushing agent. The resulting compositions, however, are highly viscous pastes which are difficult to handle and hence give poor pigment distribution in the final product. Furthermore, long dispersion times are required to obtain adequate distribution of the pigment in the oil binder.

Thus, it is an object of this invention to provide a process for preparing concentrated, i.e., more than 35 weight %, iron blue pigment compositions of an acceptable fluidity and to produce iron blue pigment compositions which can be dispersed more easily in a desired medium and which provide optimum color development, particularly in such applications as printing inks, paints, enamels and plastic materials.

Now, in accordance with this invention, it has been found that the above objects can be realized in a flushing process which is carried out in the presence of an amine flushing agent provided that at some stage of the process at least one surfactant of the polyoxyethylene type is incorporated into the composition. Accordingly, the present invention is directed to an improved process wherein, in a process for producing an iron blue pigment composition by subjecting a mixture of water-wet iron blue and an oil binder to a flushing operation in the presence of an amine flushing agent until a separate water phase is formed, separating the water phase, removing residual water and recovering the resulting pigment composition, the improvement comprises incorporating into the iron blue pigment composition at least one surfactant of the polyoxyethylene type, and to the pigment composition so produced.

The oil binders conventionally used with iron blue pigments are the known process oils which are both aromatic and paraffinic-naphthenic in nature and are used in various industries and particularly the printing ink industry where they constitute the basis for many inks. Particularly preferred binders are the mineral oils, paraffin oils and liquid alkanes.

The flushing agents conventionally used with iron blue pigments are of the amine type and include the primary, secondary and tertiary amines or quaternary ammonium compounds which are oil-soluble and water-insoluble. Typical of the substituted tertiary amines which are useful are the heterocyclic tertiary amines such as the alkyl imidazolines and oxazolines. Other amines which can be used are the polyethoxylated fatty amines or amides and the N- higher alkyl substituted amino acids. Particularly preferred of the imidazolines are those having the structural formula

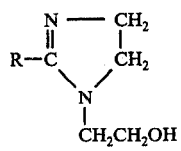

where R is a hydrocarbon group containing 14 to 20 carbon atoms, and the most preferred imidazoline is 1-(2-hydroxyethyl)-2-n-heptadecenyl-2-imidazoline.

The amount of amine flushing agent used should be sufficient to facilitate flushing of the pigment from its water-wet phase to the oil phase and separation of the water as a distinct phase. Usually the amine will be present in an amount ranging from 1 to 10%, and preferably 1 to 3.5%, by weight of the final composition.

As indicated above, at least one polyoxyethylene type of surfactant is incorporated with the iron blue pigment composition at some stage of the process. Thus, all or part of the polyoxyethylene type of surfactant can be added prior to flushing, or the surfactant can be added following separation of the water phase and/or after removal of the residual water, in which case the surfactant is usually incorporated into the paste by additional kneading. The amount of surfactant used will usually range from about 0.1 to 10%, and preferably from 1 to 3.5%, by weight of the final composition and most preferably, the weight ratio of the amine flushing agent to the polyoxyethylene type surfactant will be about 1:1.

The surfactants of the polyoxyethylene type which are preferred fall into the following four general classes:

A — polyether alcohols, which are condensates of ethylene oxide and an alcohol, and particularly, polyether alcohols of the formula

where R is a saturated or unsaturated hydrocarbyl group containing 14 to 20 carbon atoms and particularly a cetyl or oleyl group;

B — fatty acid esters of polyoxyethylene glycerol ethers and particularly compounds of the formula

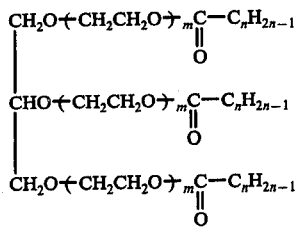

where $m$ is an integer from 9 to 15, preferably 11, and $n$ is an integer from 16 to 20, and preferably 18;

C — monoesters of glycerol diethanol ether of the formula

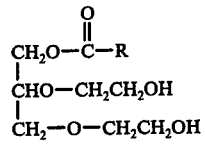

where R is a saturated or unsaturated hydrocarbyl group containing 14 to 20 carbon atoms and preferably is an oleyl group; and D — fatty acid amides of polyethylene glycols and particularly compounds of the formula

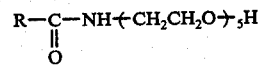

where R is a saturated or unsaturated hydrocarbyl group containing 14 to 20 carbon atoms and preferably is a stearyl group.

The process of this invention is a flushing process wherein the original primary iron blue pigment is transferred from its water-wet form into an oil which preferentially wets the pigment and displaces water, and the water is removed. In a preferred embodiment, the process is carried out as follows. A filter presscake of iron blue is kneaded in a kneading device such as a "Sigma blade mixer" with sufficient mineral oil to separate out all of the water in the presence of a small amount of a flushing agent until phase reversal occurs and the water phase separates from the oil-pigment phase. The separated water is then poured off and the residual water is removed by evacuation and heating. The resulting paste is very stiff and rubbery and cannot be kneaded further except with great difficulty. Next a small amount of a surfactant of the polyoxyethylene type and preferably at least one compound of classes A to D above is added to the paste and kneading is continued until the surfactant is uniformly incorporated into the paste and the paste becomes smooth and homogeneous. If desired, all or part of the surfactant can be added at an earlier stage such as prior to or during flushing, or following removal of the separated water. When the surfactant is present during flushing, the kneading process proceeds more readily due to the viscosity-lowering effect of the combination of flushing agent and surfactant.

The products of this invention can be generally described as relatively soft pastes which contain at least 35% and preferably from about 50 to about 80% of iron blue pigment. The viscosities of the pastes will vary depending primarily on the specific surface area of the pigment and the particular surfactant employed. It is, of course, understood that all surfactants of the polyoxyethylene type will not influence the paste rheology (viscosity) in exactly the same manner and that some will perform better than others with a given flushing agent. Of the classes set forth above, the surfactants which are polyether alcohols, and particularly the cetyl alcohol-pentaoxyethylenes, give outstanding improvement in the consistency of the iron blue pastes when used with imidazoline flushing agents. All of the compounds of classes A to D, however, provide substantial improvements over the pastes made with only the flushing agents.

The pastes of this invention are particularly useful as additives for printing inks and, depending upon their consistencies, can be used to achieve different effects. For example, the softest pastes, and particularly those of low viscosity, give more strongly colored and often slightly reddish-blue inks. When the iron blue compositions are added to printing inks of the type which contain carbon black, the inks are optically blacker due to the toning effect of the iron blue.

The invention is further illustrated by the following examples wherein all parts and percentages are by weight unless otherwise specified.

EXAMPLE I

A kneading machine was charged with an iron blue pigment presscake containing 500 parts of iron blue pigment, dry basis, 305 parts of mineral oil (paraffinic type) and 18 parts of the imidazoline surfactant, 1-(2-hydroxyethyl)-2-n-heptadecenyl-2-imidazoline, and the charge was kneaded until the pigment transferred to the oil phase. The water which separated from the oil phase was poured from the machine and the charge was heated under vacuum at about 80° C. to remove residual water. The resulting composition was a very stiff, rubbery paste which could not be kneaded further. Next, 18 parts of oleyl alcohol pentaoxyethylene were added to the composition and kneading was continued to smoothness, giving a final paste containing 59.5% of iron blue pigment.

EXAMPLE II

A kneading machine was charged with an iron blue pigment presscake containing 500 parts of iron blue pigment, dry basis, 260 parts of a paraffinic type mineral oil, 10 parts of 1-(2-hydroxyethyl)-2-n-heptadecenyl-2-imidazoline and 7.3 parts of oleyl alcohol pentaoxyethylene and the charge was kneaded until the pigment transferred to the oil phase. The water which separated from the mass was poured off and the mass was heated under vacuum at about 80° C. to remove residual water. Next, 6.5 parts of oleyl alcohol pentaoxyethylene were added to the mass and kneading was continued until the product appeared smooth. The product was a smooth paste having an iron blue pigment content of 64%.

EXAMPLE III

The procedure of Example II was repeated except that the initial charge contained 400 parts of iron blue pigment, 200 parts of the mineral oil and 14 parts of N-coco-beta-aminobutyric acid, following transfer of the pigment to the oil phase 9 parts of oleyl alcohol pentaoxyethylene were added, kneading was continued and the product was recovered by removing the water. The product of this example was a smooth paste of good consistency.

EXAMPLE IV

A kneading machine was charged with an iron blue presscake containing 500 parts of iron blue pigment, dry basis, 220 parts of a paraffinic type mineral oil and 11 parts of stearamido pentaoxyethylene alcohol, and the charge was kneaded as in Example 1. Transfer of the pigment to the oil phase and water separation occurred more slowly than in Example I and the paste which was obtained following removal of the residual water was of poor consistency. Next, 6.4 parts of oleyl alcohol pentaoxyethylene were added to the dried mass and kneading was continued. The resulting paste had a much better consistency than the paste which had not been treated with the oleyl alcohol pentaoxyethylene but was not quite as smooth as the product of Example I.

EXAMPLE V

The procedure of Example II was repeated except that the initial charge contained 530 parts of iron blue pigment, 420 parts of mineral oil and 25 parts of oleyl-imidazoline monooleate and following removal of the residual water, 25 parts of oleyl alcohol pentaoxyethylene were added. The product of this example was a smooth paste of a useable consistency and contained 53% of iron blue pigment.

EXAMPLE VI

The general procedure of Example II was repeated except that the initial charge contained 290 parts of iron blue pigment, 200 parts of mineral oil and 14 parts of 1-(2-hydroxyethyl)-2-n-heptadecenyl-2-imidazoline and, following removal of the residual water, a solution of 14 parts of cetyl alcohol pentaoxyethylene in 14 parts of mineral oil was added. The product of this example contained 53% of iron blue pigment, was a smooth paste of excellent consistency and had a viscosity of 58 poises at 20° C. (Laray viscosimeter). The pigment was extremely well dispersed in the paste and the size of the pigment particles averaged 0.025 micron.

When 10 parts of the paste of this example were added to 90 parts of a black printing ink varnish containing 80% of printing ink vehicle and 20% of carbon black, and the resulting ink was used for printing newsprint, the print was considerably blacker in color, at an equal pigment level, than that achieved with conventional pastes.

What I claim and desire to protect by Letters Patent is:

1. In a process for producing an iron blue pigment composition in paste form by subjecting a mixture of water-wet iron blue and an oil binder to a flushing operation in the presence of an amine flushing agent until a separate water phase is formed, separating the water phase, removing residual water and recovering the resulting pigment composition, the improvement which consists of incorporating into the iron blue pigment composition at least one surfactant of the polyoxyethylene type.

2. The process of claim 1 wherein the surfactant is present during the flushing operation.

3. The process of claim 1 wherein the surfactant is incorporated in the composition following removal of the water.

4. The process of claim 3 wherein the flushing agent is a heterocyclic tertiary amine.

5. The process of claim 4 wherein the heterocyclic tertiary amine is 1-(2-hydroxyethyl)-2-n-heptadecenyl-2-imidazoline.

6. The process of claim 5 wherein the surfactant is at least one compound selected from the group consisting of polyether alcohols, fatty acid esters of polyoxyethylene glycerol ethers, monoesters of glycerol diethanol ether and fatty acid amides of polyethylene glycol.

7. The process of claim 6 wherein the surfactant is a condensate of ethylene oxide and oleyl alcohol.

8. The process of claim 7 wherein the surfactant is oleyl alcohol pentaoxyethylene.

9. An iron blue pigment composition produced according to the process of claim 6.

10. The composition of claim 9 wherein the iron blue pigment ranges from 50 to 80% by weight of the composition.

* * * * *